United States Patent [19]
Graham

[11] 3,976,314
[45] Aug. 24, 1976

[54] TUBE COUPLER
[75] Inventor: Charles H. Graham, Los Altos Hills, Calif.
[73] Assignee: Paul M. Hankison, Canonsburg, Pa.
[22] Filed: Jan. 3, 1975
[21] Appl. No.: 538,503

[52] U.S. Cl. ................................ 285/238; 285/340; 285/345; 285/417; 285/423; 285/DIG. 16
[51] Int. Cl.² .................... F16L 33/22; F16L 47/00
[58] Field of Search ............ 285/340, 238, DIG. 22, 285/382.7, 403, 345, 423, 356, 156, 150, 179, 417

[56] References Cited
UNITED STATES PATENTS

| | | | |
|---|---|---|---|
| 1,817,776 | 8/1931 | Sipe | 285/340 |
| 2,484,192 | 10/1949 | Squiller | 285/340 X |
| 2,529,552 | 11/1950 | Herold | 285/382.7 X |
| 2,787,480 | 4/1957 | Staller | 285/238 |
| 2,831,711 | 4/1958 | Leadbetter | 285/403 X |
| 3,019,284 | 1/1962 | Matthysse | 285/340 X |

FOREIGN PATENTS OR APPLICATIONS

| | | | |
|---|---|---|---|
| 1,925,171 | 11/1969 | Germany | 285/340 |
| 107,946 | 4/1964 | Netherlands | 285/238 |
| 1,118,384 | 7/1968 | United Kingdom | 285/340 |
| 1,029,123 | 5/1966 | United Kingdom | 285/340 |

Primary Examiner—Thomas F. Callaghan
Attorney, Agent, or Firm—Webb, Burden, Robinson & Webb

[57] ABSTRACT

A coupler or fitting for connecting ductile tubes or pipes includes a coupler body having one or more ports therein, and a ferrule which is friction-fitted within each port, the ferrule having a radially-inward flaring lip for biting into and locking a tube inserted therein and for creating a seal between the tube and the body, and a radially-outward flaring lip for biting into and locking the ferrule within the body.

5 Claims, 5 Drawing Figures

TUBE COUPLER

BACKGROUND OF THE INVENTION

The present invention relates to an improved coupler for ductile or deformable tubing.

There is a large variety of fittings or couplers available for connecting or joining ductile or deformable tubes or pipes together. Tubing of this type includes various composition tubing such as, for example, tubes made of various types of plastic, nylon, rubber, or other soft and malleable materials, such as wood, soft metals, etc.

Such couplers are used to join tubes in a number of different ways. For example, some are linear to join a pair of tubes, end-to-end. Others form elbow, T, and cross configurations. Various other multiple-port configurations are also One of the most common types of coupler used to join ductile tubing of this type is sometimes referred to as the compression-nut type. U.S. Pat. No. 2,473,118 and No. 3,007,721 are examples of this type of coupler. Typically, this type of connector includes a body having a receiving bore or port into which a tube to be coupled is inserted. The body is threaded along its exterior surface. A ferrule fits over the end of the tube to be coupled. A compression nut encircles the end of the ferrule and screws onto the exterior of the body. At the same time, it engages the ferrule and as it is screwed onto the body it forces the ferrule axially along the tube and is radially contracted so that it "bites" into the tube. This locks the tube within the body and creates a fluid seal.

While functionally this type of connector is satisfactory, it has several significant disadvantages. For each connection, three individual parts are required. If, for example, the nut is lost or damaged, unless other parts are available, it is not possible to make the coupling. Also, tools are required to tighten the compression nut and care must be taken to tighten the nut to insure a good seal but not so tight as to rupture the tube.

Also, with many couplers of this type, in the process of tightening the compression nut, the ferrule is damaged or deformed and is not reusable.

There are threadless connectors in the prior art but these also require a multiplicity of parts. For example, in one such patent, U.S. Pat. No. 2,831,711, a separate sealing ring is provided in addition to a locking ring.

SUMMARY OF THE INVENTION

It is therefore an object of the invention to provide an improved coupling device for ductile tubes or pipes.

Another object of the invention is to provide a pipe or tube coupler which is simple with few parts and which requires no tools or special skills to assemble.

Another object of the invention is to provide an improved connector for soft and deformable tubes or pipes which is reusable.

The tube connector of the present invention does not make use of compression nuts or the like. The tube coupler of the present invention includes a coupler body which has one or more bores or ports therein. A generally cylindrically-shaped ferrule, having a radially-inward flaring circumferential lip at one end and a radially-outward flaring circumferential lip of the other end is inserted within a port into which a tube is to be coupled.

The ferrule fits snugly within the bore. The end of the ferrule with the inward flaring lip is the end which goes into the bore first. When a ductile tube is inserted through the ferrule, this lip bites into the outside of the tube to lock the tube within the body as well as form an effective fluid seal. The outward flaring lip at the outer end of the ferrule bites into the coupler body to lock the tube/ferrule assembly therein.

The ferrule can be inserted at the time of manufacture of the body or at the place of installation. The former has the advantage of eliminating the necessity of having to have any parts or tools at the time of the coupling assembly. As will be shown, the coupling assembly of the present invention has applicability to any tube-coupling configuration and is reusable.

DESCRIPTION OF THE PREFERRED EMBODIMENTS

Figure 1:
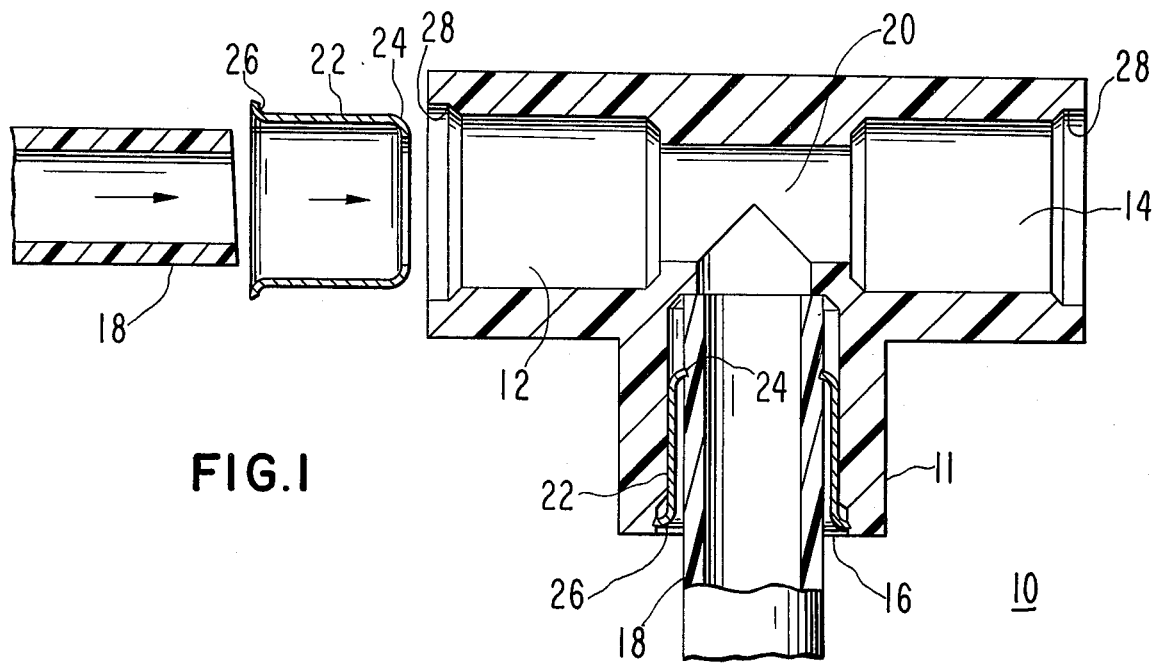
FIG. 1 is a cross-sectional view of the improved tube coupling assembly of the present invention in a T-configuration with a part thereof shown in an exploded view.

FIG. 1 illustrates a T-coupler 10 in accordance with the principles of the present invention. Coupler 10 includes a coupler body 11 having three bores or ports 12, 14 and 16 which are each capable of receiving a ductile or deformable tube 18.

Inserted within each of the ports is a ferrule 22 which is generally cylindrical and is made out of a stiff material such as brass or other metal. The inner end of each ferrule is provided with a radially-inward flaring circumferential lip 24. A radially-outward flaring circumferential lip 26 is provided at the outer end of the ferrule 22.

The ferrule 22 is inserted into the port in the manner indicated with reference to port 12. As shown by the ferrule inserted in port 16, the ferrule 22 forms a snug, friction-fit with the walls of the coupler body 11. While not necessary in many applications, a suitable adhesive may be provided on the outside surface of the ferrule 22 and/or along the inside surface of the port walls. This may be desirable when the housing is made from a metal or non-composition material. However, in most applications, as for example when the housing 11 is made of a thermo-plastic, the adhesive is not necessary for a good fluid seal.

Each of the ports is provided with an annular, enlarged diameter portion 28. The diameter of the ferrule 22 corresponds to that of the ports except for the outwardly extending lip 26. This lip fits within the enlarged annular portion 28 and the small diameter of the rest of the port prevents further entry of the ferrule into the coupler body 11. The outward flaring lip 26, when it is inserted into the port, bites into the wall of the port so that the ferrule 22 cannot easily be removed from the coupler body once it has been inserted.

Once the ferrule 22 has been inserted within the port, the tube 18 is then axially inserted through the ferrule until the end thereof goes past the inwardly flaring lip 24. Ultimately, the progress of the tube 18 is arrested by virtue of the reduced diameter of the internal passageway 20 as shown.

The inwardly flaring lip 24 bites or plows into the tubing 18 as it is inserted within the port. The lip is at an angle of slightly less than 90° to the main part of the ferrule body so that the tube 18 is firmly locked within the port and axial movement of the tube out of the port is prevented whether from external forces on the tubing or from internal fluid pressure.

In addition to locking the tube 18 within the coupler body 11, ferrule 22 also acts as an effective fluid seal to prevent escape of fluids passing through the tubes and coupler assembly. This seal results from the friction fit between the ferrule 22 and the port walls as well as the result of the digging in action of the inward flaring lip 24 circumferentially around the tubing 18.

The ferrule 22 can be inserted into the ports during the manufacturing process. This has the advantage that when the coupling is made in the field, the installer need not have any parts whatsoever other than the coupler body inself and the tubes or pipes to be coupled. All that is necessary is that the installer insert the tubes or pipes within the coupler body ports and through the inner end of the ferrule. As explained above, inward progress of the tube is automatically arrested by virtue of the geometry of the ports and inner passage 20. However, the installation of the ferrule can be done in the field with a relatively simple tool and so the ferrules can be inserted at the time that the coupling is made, if desired or required.

The outwardly flaring lip 26 also forms an angle to the remainder of the ferrule body which is somewhat less than 90° and bites into the coupler body 11 so that the combination of the ferrule 22 and the inserted tube 18 cannot be dislodged easily.

It is, however, possible to pull out the tubing 18, if desired, if sufficient force is applied to the tubing externally of the coupling body 11. In so doing, no damage is done to the ferrule 22 and it is possible to insert another tubing which is locked and sealed with equal effect.

Figure 2:
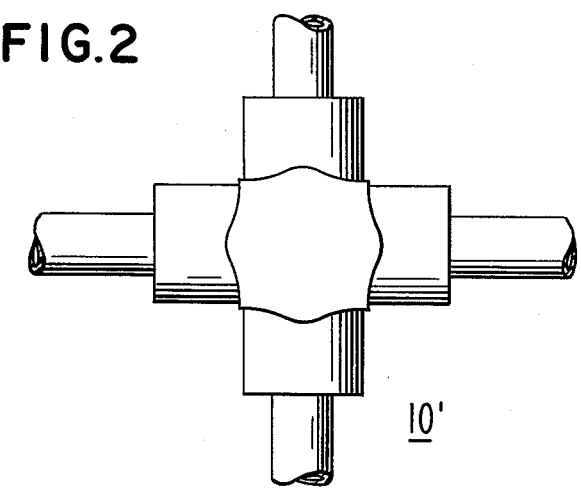
FIG. 2 is a plane view of a four-port coupler assembly in accordance with the invention.
Figure 3:
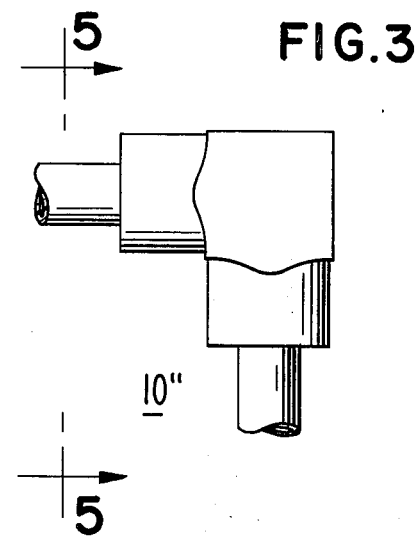
FIG. 3 is a plane view of an elbow coupler in accordance with the present invention.
Figure 4:
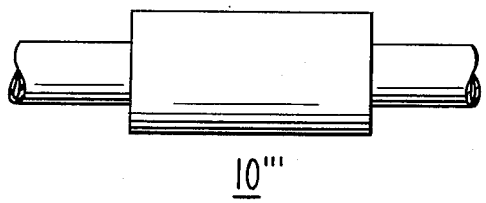
FIG. 4 is a plane view of a linear coupler in accordance with the present invention.
Figure 5:
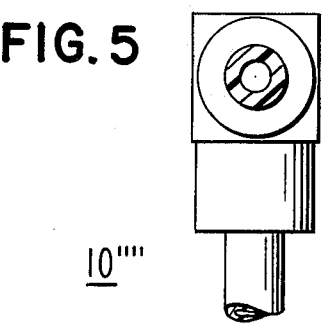
FIG. 5 is a view of the elbow coupler of FIG. 3 in the direction indicated by the arrows.

The coupling assembly of the present invention is not limited to any particular type of coupling configuration. For example, FIG. 2 illustrates a four-port coupler, FIGS. 3 and 5 an elbow coupler and FIG. 4 a simple end-to-end coupler. This coupling arrangement is also applicable to other multiple port couplers or manifold configurations.

In one actual embodiment, the body 11 was made from a DuPont Corporation plastic designated Delrin. Other materials which can be used to make the body 11 include polyethylene or PVC plastics.

This coupler is suitable for tubing or pipes made out of many different types of material. The only requirement is that the material be such that the lip of the ferrule can bite into the surface of the tubing sufficiently to hold it in place. Common tubing materials include rubber, polyethylene, PVC and other composition materials.

What is claimed is:
1. A coupler for a ductile tube comprising:
    a. a body having at least two generally cylindrical ports therein;
    b. a generally cylindrically-shaped thin-walled ferrule, said ferrule having a substantially uniform wall thickness throughout the entire length thereof and insertable within at least one port of said body, the outside surface of said ferrule forming a snug, friction fit with the port wall to sealingly engage the port wall;
    c. said ferrule having a single radially-inward flaring continuous circumferential lip at the inner extremity thereof, and a radially-outward flaring continuous circumferential lip at the outer extremity thereof;
    d. said radially-outward flaring lip biting into the port wall when inserted therein to retain it in place and prevent dislocation therefrom; and
    e. said radially-inward flaring lip biting into the exterior surface of the tube when inserted therein, said lip locking the tube within said body and providing a fluid seal between the tube and said body.

2. A coupler as in claim 1 including first means for preventing the tube from being inserted beyond a predetermined point within said port.

3. A coupler as in claim 2 wherein said first means comprises said port having a reduced diameter section.

4. A coupler as in claim 1 including second means for preventing said ferrule from being inserted beyond a predetermined point with said bore.

5. A coupler as in claim 4 wherein said second means comprises an annular portion having a larger diameter than the remainder of said port at the outer end of said port, said radially-outward flaring lip fitting therein.

* * * * *